United States Patent
Small

(10) Patent No.: US 7,848,397 B2
(45) Date of Patent: Dec. 7, 2010

(54) FREQUENCY COHERENCE WITHIN A LOCATION NETWORK

(75) Inventor: David Small, Canberra (AU)

(73) Assignee: Locata Corporation Pty Ltd, Canberra (AU)

( * ) Notice: Subject to any disclaimer, the term of this patent is extended or adjusted under 35 U.S.C. 154(b) by 358 days.

(21) Appl. No.: 11/504,309

(22) Filed: Aug. 16, 2006

(65) Prior Publication Data

US 2007/0041427 A1 Feb. 22, 2007

Related U.S. Application Data

(62) Division of application No. 10/494,024, filed as application No. PCT/AU02/01495 on Nov. 1, 2002.

(30) Foreign Application Priority Data

Nov. 2, 2001 (AU) .................................... PR8643

(51) Int. Cl.
*H04B 1/38* (2006.01)
(52) U.S. Cl. .................. 375/220; 375/219; 375/306; 375/342; 375/350; 455/91; 455/112; 455/118
(58) Field of Classification Search ......... 375/219–220, 375/354, 364, 135, 223, 245, 250, 295, 306, 375/316, 342, 350; 340/426.19; 342/357.06; 701/213; 370/342, 203, 335; 455/91, 95, 455/112, 118
See application file for complete search history.

(56) References Cited

U.S. PATENT DOCUMENTS 5,970,400 A * 10/1999 Dwyer ....................... 455/254
6,526,265 B1 * 2/2003 Damgaard et al. .......... 455/118
6,763,241 B2 * 7/2004 Gous et al. .................. 455/502
6,829,534 B2 * 12/2004 Fuchs et al. ................. 701/213
6,873,612 B1 * 3/2005 Steer et al. .................. 370/342
7,023,381 B2 * 4/2006 Zimmerman et al. ........ 342/386
7,236,883 B2 * 6/2007 Garin et al. ................. 701/213
2002/0167934 A1 * 11/2002 Carter et al. ................ 370/350
2003/0068977 A1 * 4/2003 King ......................... 455/12.1

* cited by examiner

*Primary Examiner*—Shuwang Liu
*Assistant Examiner*—Hirdepal Singh

(57) ABSTRACT

Generating frequency coherence between a received reference positioning signal carrier component transmitted by at least one reference transmitter and a unique positioning signal carrier component generated by a positioning-unit device. The positioning-unit device receives a reference positioning signal and measures a frequency offset of the reference positioning signal carrier component relative to a common oscillator. Once a frequency offset is measured, the positioning-unit device adjusts a frequency steerable clock by an amount derived from the measured frequency offset. The positioning-unit device then generates a unique positioning signal carrier component at an aligned carrier frequency with the reference positioning signal carrier component. Furthermore, the positioning-unit device continuously adjusts the unique positioning signal carrier component by applying the measured frequency offset to the frequency steerable clock, which is reference to the common oscillator. Subsequently, the frequency of the adjusted unique positioning signal carrier component is aligned with the frequency of said reference positioning signal carrier component.

10 Claims, 9 Drawing Sheets

FREQUENCY COHERENCE WITHIN A LOCATION NETWORK

FIELD OF THE INVENTION

The present invention relates generally to systems and methods for generating precise position determinations for a mobile apparatus. In particular, the present invention applies to precise time-of-arrival position determination systems. The present invention is not constrained by prior art requirements such as physical connections between transmitter beacons, such as the need for atomic time standards connected to each transmitter, or the need for differential correction techniques.

BACKGROUND OF THE INVENTION

It is well understood in the art that precise time-of-arrival position determination is dependant upon the accuracy of the transmitter clocks used. In its most rudimentary form, three transmitter beacons positioned at known locations and connected to a common clock via three identical length cables will suffice as the basis for a time-of-arrival positioning system. However this rudimentary positioning system is highly impractical to manufacture and install due to the requirement for precisely timed cables distributing high frequency timing signals over potentially large distances between beacons. Alternatively, precision atomic time standards, which have very low drift rates, may be installed at each transmitter beacon and monitored using a reference receiver positioned at a known location and connected to a reference timebase. In response to positioning signals received from the transmitter beacons, clock corrections are sent from the reference receiver via an RF data link to each beacon, for subsequent retransmission to user equipment. Modern satellite positioning technologies such as GPS employ this technique, wherein cesium and rubidium time standards are installed in each GPS satellite, with the GPS Ground Control Segment continually monitoring all GPS satellites and up-linking clock corrections to each satellite every twenty four hours. These corrections are then rebroadcast via each satellite's navigation message to GPS user equipment, so that positioning algorithms within the GPS user equipment can account for satellite clock error. With at least four GPS satellites in view, a three-dimensional position is accomplished in GPS user equipment using a standard technique known as a conventional code-based GPS position solution. This standard technique is also generally termed "a single point position" by those skilled in the art.

Conventional Code-Based GPS Position Solution (Single Point Position)

In conventional code-based GPS, the latitude, longitude, and altitude of any point close to the earth can be calculated from the propagation times of the positioning signals from at least four GPS satellites in view. A GPS receiver makes range computations based on the correlation of internally generated pseudorandom code (PRN) sequences with received pseudorandom code sequences from each GPS satellite. The measured ranges are referred to as pseudoranges as there is a time difference, or offset, between the clocks on the satellites and the clock within the GPS receiver. It is necessary to ensure that the receiver's clock is synchronized with the satellite constellation's clock in order to accurately measure the elapsed time between a satellite's pseudorandom code sequence transmission and reception of that pseudorandom code sequence by a GPS receiver. A navigation message is also transmitted from each satellite, which includes time information, satellite orbital information, and satellite clock correction terms. For three-dimensional positioning a GPS receiver requires four satellite signals to solve for the four unknowns of position (x, y, z) and time (t). For two-dimensional (2-D) positioning, altitude is fixed, and three satellite signals are required to solve for three unknowns of position (x and y) and time (t). A conventional code-based GPS position solution is able to provide a GPS receiver, with at least four satellites in view, the capability to determine an absolute three-dimensional (3-D) position with an accuracy of approximately 10 to 20 meters.

This Conventional Code-based GPS position solution is an autonomous solution, which can determine position, velocity, and time (PVT) without differential correction data from reference receivers. It has therefore become known as a "single point" position solution in the art.

Conventional Code-Based Differential GPS (Relative Positioning)

With an established accurate atomic timebase the GPS constellation is only capable of providing a GPS receiver with an absolute three-dimensional position accuracy of approximately 10 to 20 meters. This is due to the corruption of positioning signals from six major error sources: (1) ionospheric delay, (2) tropospheric delay, (3) ephemeris error, (4) satellite clock error, (5) GPS receiver noise and, (6) multipath. Ionospheric delay is the varying time delay experienced by electromagnetic waves when passing through bands of ionized particles in the ionosphere. Tropospheric delay is the time delay experienced by electromagnetic waves when passing through moisture in the lower atmosphere. Ephemeris error is the difference between the actual satellite location and the position predicted by satellite orbital data. Receiver noise is the noise generated by the internal electronics of a GPS receiver. Multipath is the signal delay caused by localized signal reflections in close proximity to a GPS receiver. The majority of these error sources are spatially correlated over relatively short distances (i.e. tens of kilometers). This means that two different GPS receivers within this proximity to one another will observe the same errors. It is therefore possible to improve the spatially correlated error sources using a technique known as "Differential Correction". A reference receiver placed at a well-known location computes an assumed pseudorange for each satellite signal it detects. It then measures the received pseudoranges from the GPS satellites and subtracts the assumed pseudoranges from the received pseudoranges, forming a differential range correction for each satellite in view. The reference receiver then sends these corrections as digital data to the GPS receiver via an RF data link. The GPS receiver subsequently adds these corrections to the pseudoranges it measures (for the same satellites in view to the reference receiver) before calculating a position solution. Errors common to both reference receiver and the GPS receiver are completely removed by this procedure. Uncorrelated error sources such as multipath and receiver noise remain in the pseudoranges and subsequently degrade position accuracy. Position accuracies in the order of several meters are achievable with code-based differential GPS correction in low multipath environments.

Conventional Carrier-Based Differential GPS (Relative Positioning)

Conventional carrier-based differential GPS (CDGPS) calculates the difference between the reference location and the user location using the differences between the carrier phases of the satellites measured at the reference receiver and the user receiver. A CDGPS reference receiver, installed at a well-known location, calculates simultaneous carrier phase measurements for all satellites in view, and then broadcasts carrier phase data to the user receiver via an RF data link. The user receiver also calculates simultaneous phase measurements for all satellites in view, and subsequently computes a phase difference to determine the position of the user receiver with respect to the reference receiver location. The carrier phase measurements are a running cycle count based on the Doppler frequency shift present on the carrier frequencies from the GPS satellites. Each epoch, this running cycle count (the value from the previous epoch plus the advance in phase during the present epoch) is available from the receiver. More specifically, the advance in carrier phase during an epoch is determined by integrating the carrier Doppler offset over the interval of the epoch, hence the name Integrated Carrier Phase (ICP).

The user receiver can measure the fractional phase plus an arbitrary number of whole cycles of the carrier, but cannot directly determine the exact number of whole cycles in the pseudorange. This number, known as the "integer cycle ambiguity", must be determined by other means. Traditional strategies for resolving carrier phase integer ambiguities fall into three broad classes: search methods, filtering methods, and geometrical methods. These traditional methods do not yield instantaneous integer cycle ambiguity resolution. A technique, known as "wide-laning", has been developed to overcome the non-instantaneous integer cycle ambiguity problem. Wide-laning multiplies and filters two carrier frequencies (traditionally the GPS L1 and L2 frequencies) to form a beat frequency signal. This beat frequency wavelength is significantly longer than the wavelengths of the two individual carriers. Consequently, resolution of the integers can be accomplished by using pseudorange observations to determine the integer ambiguity of the wider "lanes" formed by the beat frequency signal. These, in turn, greatly reduce the volume of integers that must be searched to resolve the integer ambiguity.

The main constraints for CDGPS methods are firstly the integrity and latency of the RF data link, and, secondly, the lack of time determination at the user receiver. The data bandwidth of the RF data link constrains differential data update rates, causing data latency and degrading position accuracy. Poor reception of differential data caused by physical obstruction and multipath causes data corruption, which degrades position accuracy at best, and results in total link failure and no position update at worst. The second shortcoming of CDGPS is the lack of time determination. A conventional single point position solution solves for the four unknowns of position (x, y, z) and time (t). CDGPS uses a process known as "double differences", which eliminates the receiver clock terms for both the reference receiver and the user receiver. Therefore, the user receiver can determine accurate position with respect to the reference receiver position, but cannot determine time. This is unimportant if the user is simply, and only, interested in position. However, precise knowledge of an accurate system timebase is very beneficial to many user applications involving computer networks and telecommunication systems. The lack of time determination is a major problem associated with CDGPS prior art systems.

Pseudolite Augmentation

Another approach used to aid GPS position determination is the use of ground-based augmentation systems such as pseudolites. Pseudolites can be incorporated into Conventional Code and Carrier-based Differential GPS systems without any additional infrastructure requirements. They can be used as additional ranging signals, and also as RF data links to send differential corrections to user equipment. Alternatively, pseudolites can be synchronized to the GPS timebase. A GPS receiver determines GPS time from a conventional code-based GPS solution using at least four GPS satellites and passes the determined time to a co-located pseudolite transmitter. The accuracy of the GPS timebase is constrained by GPS error sources including ionospheric and tropospheric delay, satellite clock error, satellite position error, receiver noise, and multipath. Time accuracies of approximately 50 to 100 nanoseconds are achievable by using the GPS timebase method, however this translates to position accuracies only in the order of tens of meters. This accuracy is much too coarse for precise navigation systems.

Carrier-Based Differential GPS using an "Omni-Marker" Pseudolite

U.S. Pat. No. 5,583,513 to Cohen, titled "System and Method for Generating Precise Code-based and Carrier Phase Position Determinations" describes a differential correction method whereby a so called "omni-marker" pseudolite serves as a channel for relaying information to a position receiver for making differential ranging corrections (Column 6, lines 43 to 46). The omni-marker pseudolite can be described as a metaphorical mirror, whereby GPS satellite signals are "reflected" in-phase from the known omni-marker pseudolite position to the position receiver. Thus, the out-going carrier and PRN code components of each of the beacon marker signals is exactly phase coherent with respect to their incoming counterparts in the GPS signals (Column 6, lines 28 to 32). A position receiver situated in an over-flying aircraft receives positioning signals from the GPS satellites and also receives "reflected" GPS positioning signals from the omni-marker pseudolite, and subsequently computes differential range measurements.

Cohen's differential method eliminates the need for a traditional digital data link, as required by conventional code and carrier-based differential systems. However, an omni-marker position receiver must still receive both GPS satellites and omni-marker signals to compute a differential range measurement. Receiving omni-marker signals alone will not allow a position computation. Also, the omni-marker must generate and transmit individual carrier and PRN components for each GPS satellite in view, making the omni-marker complex and expensive. Currently, this would require up to twelve individual transmissions from a single omni-marker. Further, an omni-marker position receiver requires double the receive channels of a conventional differential GPS receiver, adding to the cost and complexity.

Differential Range Measurements using "Ground Transceiver" Pseudolites

U.S. Pat. No. 6,121,928 to Sheynblat, titled "Network of Ground Transceivers" describes a differential correction method whereby a network of so called "ground transmitter" and "ground transceiver" pseudolites serve as channels for relaying information to a position receiver for the differential determination of user position (Column 5, lines 31 to 36). Sheynblat teaches the use of differential correction to overcome master clock bias (Column 5, lines 23 to 36) and line biases introduced by the ground transceiver hardware (Column 5, lines 38 to 67 and Column 6, lines 1 to 23). Sheynblat's differential methodologies and embodiments include: (i) a user receiver differencing ground transceiver signals with a ground transmitter signal (Column 5, lines 31 to 36, and claim 2), (ii) a user receiver differencing multiple master ground transmitter signals with a ground transceiver (Column 6, lines 25 to 67, Column 7, lines 1 to 33), and (iii) a user receiver differencing ground transceiver signals, which incorporate signals that have been differenced with a satellite signal (Column 7, lines 34 to 67, Column 8, lines 1 to 34). Sheynblat's patent teaches an advance of differential methodologies but does not teach, show, or suggest a highly desirable system that would produce single point position solutions in a roving position receiver from a network of ground transceivers.

Prior art systems will not allow time-of-arrival position determination without requiring at least one of: (a) a physical connection between transmitter beacons; (b) an atomic time standard at each transmitter; (c) synchronization to a GPS timebase; or (d) some form of differential correction. A system that can provide extremely precise time-of-arrival positioning signals, without any of these constraints, is highly desirable. The present invention achieves this desirable goal by chronologically synchronizing a system of transceivers (hereafter referred to as a Positioning-Unit Devices), as described below.

OBJECT OF THE INVENTION

It is an object of the present invention to provide a positioning system and method for making precise code and carrier phase position determinations without the need for physical interconnections between Positioning-Unit Devices.

It is yet a further object of the present invention to provide a positioning system and method for making precise code and carrier phase position determinations without the need of atomic time standards.

It is yet a further object of the present invention to provide a positioning system and method for making precise code and carrier phase position determinations without the need for a Global Navigation Satellite System timebase.

It is yet another object of the present invention to provide a positioning system and method for making precise code and carrier phase position determinations without the requirement of differential correction techniques.

It is yet a further object of the present invention to chronologically synchronize Positioning-Unit Devices to a system timebase, the system timebase not necessarily being of absolute accuracy.

It is yet a further object of the present invention to propagate a reference timebase through geographically distributed Positioning-Unit Devices.

It is yet a further object of the present invention to provide a roving position receiver with chronologically-synchronous code phase pseudoranges, such that single-point code phase position solutions can be determined without the aid of differential correction.

It is yet a further object of the present invention to provide a roving position receiver with chronologically-synchronous carrier phase pseudoranges, such that once integer cycle ambiguities are resolved, a single-point carrier phase position solution can be determined without the aid of differential correction.

It is yet a further object of the present invention to provide a roving position receiver with precise network time-transfer information.

SUMMARY OF THE INVENTION

The present invention is directed at a system and method of generating frequency coherence between a received reference positioning signal transmitted by at least one reference transmitter and a unique positioning signal generated by a positioning-unit device. A positioning-unit device is a specialized transceiver capable of receiving and interpreting reference positioning signals from the reference transmitter, another positioning-unit device or both. The positioning-unit device incorporates a common oscillator. The positioning-unit device receives a reference positioning signal and measures a frequency offset in the received reference positioning signal relative to the common oscillator. Once a frequency offset is measured, the positioning-unit device adjusts a frequency steerable clock by an amount derived from the measured frequency offset. The positioning-unit device then generates a unique positioning signal, which is aligned with the frequency steerable clock. Furthermore, the positioning-unit device continuously adjusts said unique positioning signal by applying the measured frequency offset to the frequency steerable clock, which is also referenced to the common oscillator incorporated within the positioning-unit device. Subsequently, the frequency of the adjusted unique positioning signal is aligned with the frequency of the received reference positioning signal.

In a preferred embodiment of the invention, the frequency steerable clock is adjusted by an amount equivalent to the measured frequency offset.

In another preferred embodiment of the invention, the adjusted unique positioning signal is transmitted.

In yet another preferred embodiment of the invention, the adjusted unique positioning signal functions as a reference positioning signal for other positioning-unit devices.

In another preferred embodiment of the invention, the frequency steerable clock comprises means for adjusting said frequency steerable clock by applying an additional frequency offset for a predetermined time period to time slew the unique positioning signal.

In an alternative embodiment of the invention, the reference transmitter includes positioning-unit devices, Wide Area Augmentation System satellites, Global Navigation Satellite System satellites, Pseudolites, or any other devices that incorporate timing information.

OVERVIEW

A Positioning-Unit Device is a specialized transceiver, which is positioned at a known location and receives at least one reference positioning signal from at least one reference transmitter. Preferably, the reference transmitter is another Positioning-Unit Device, or a WAAS satellite. In response to the received reference positioning signals, the Positioning-Unit Device chronologically synchronizes an internally generated positioning signal to the reference transmitter timebase and transmits its unique positioning signal to all other position receivers in view. The minimum requirement for the formation of an autonomous location network is at least two Positioning-Unit Devices chronologically synchronized to one reference transmitter. A roving position receiver in view of the all the transmitted signals within this autonomous network is capable of determining autonomous code and carrier single point position solutions without the need for differential correction. Furthermore, the reference transmitter oscillator does not need the inherent stability of atomic time standards as required by prior art systems, thereby allowing an inexpensive crystal oscillator to be used as a reference timebase for the entire location network.

Thus, as detailed below, a Positioning-Unit Device may serve as a metaphorical "channel" for distributing chronologically synchronized positioning signals to a roving position receiver. This allows the roving position receiver to calculate both code and carrier-based single point position determinations, without the need for physical connections between Positioning-Unit Devices, without requiring atomic time standards or GNSS timebases, and without requiring differential correction.

System and Method

Figure 1:
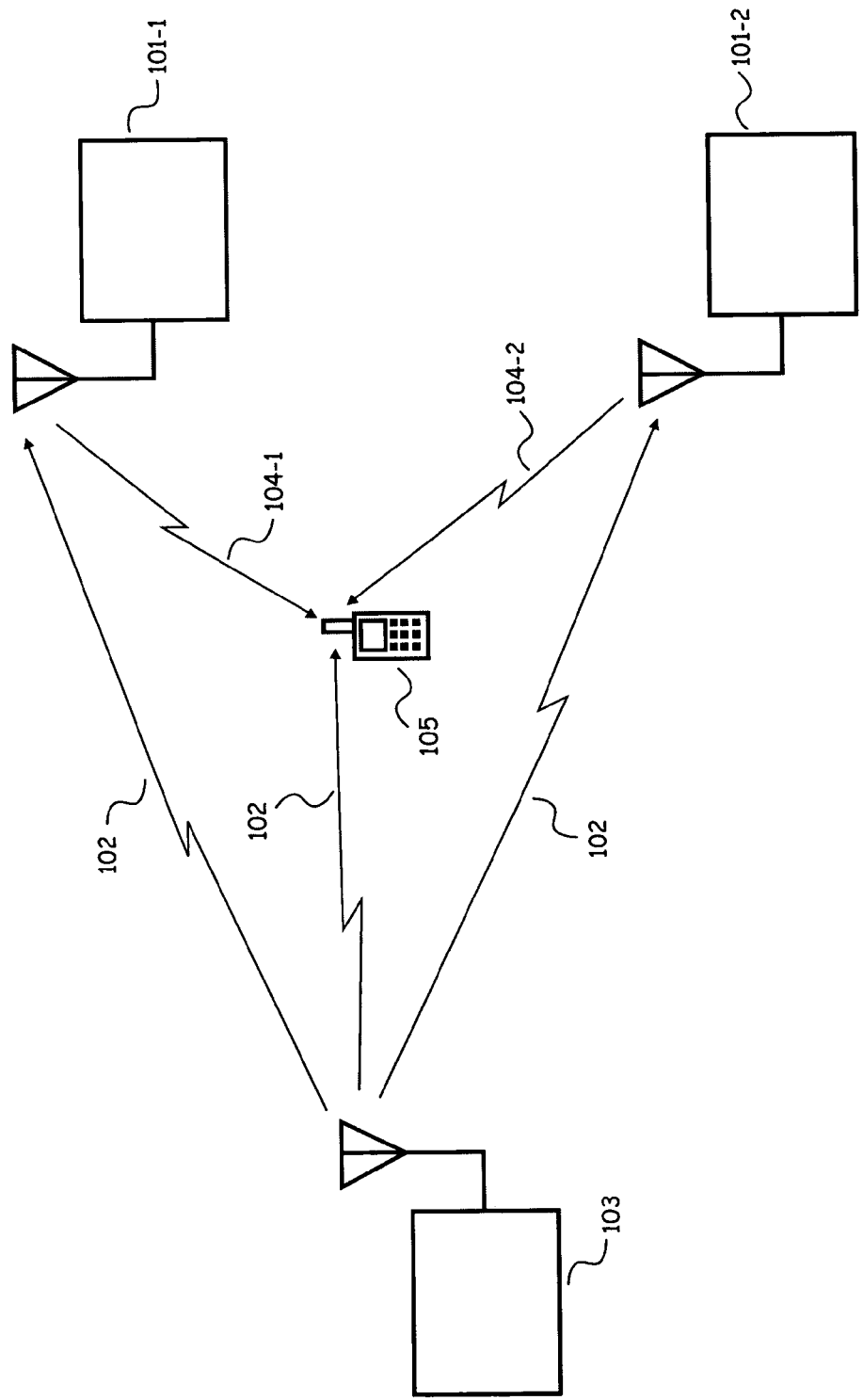
FIG. 1 is a graphical representation of one embodiment of Time-Lock according to the present invention, incorporating a single reference transmitter broadcasting to a plurality of Positioning-Unit Devices, and a roving position receiver determining an autonomous single point position solution.

FIG. 1 shows one configuration for a Positioning System that generates precise position determinations using code and carrier-based single point position calculations. A plurality of Positioning-Unit Devices 101-1 & 101-2 are positioned at known locations with respect to a reference co-ordinate system and respectively receive at least one reference positioning signal 102 broadcast by at least one reference transmitter 103, which is also positioned at a known location with respect to a reference co-ordinate system. In response to the received reference positioning signal 102 the Positioning-Unit Devices 101-1 & 101-2 transmit one or more unique positioning signals 104-1 & 104-2, which are chronologically synchronized to the reference transmitter 103. A roving position receiver 105, situated within the network of devices 101-1, 101-2 & 103, receives reference positioning signals 102 from the reference transmitter 103 and unique positioning signals 104-1 & 104-2 from the Positioning-Unit Devices 101-1 & 101-2, and autonomously calculates both code and carrier-based single point position determinations from the network of chronologically synchronized positioning signals.

Time-Lock

Time-Locked Positioning-Unit Devices synchronize to a common chronological timebase, which can be of arbitrary value and have arbitrary variance. Therefore any simple and inexpensive clock source, such as a crystal oscillator, will suffice as the reference clock in a reference transmitter. In the preferred embodiment a temperature compensated crystal oscillator (TCXO) or better is used. A Positioning-Unit Device first acquires a reference transmitter positioning signal, and calculates a so-called time-of-flight offset from the known co-ordinates of the reference transmitter and the known co-ordinates of the Positioning-Unit Device. The time-of-flight offset takes into consideration the propagation time delay experienced by the reference positioning signal whilst traveling from the reference transmitter to the Positioning-Unit Device. In free space, electromagnetic waves travel approximately one meter every three nanoseconds. Next, the Positioning-Unit Device applies the time-of-flight offset to an internally generated positioning signal and aligns this positioning signal to the incoming reference positioning signal, thus bringing the internally generated positioning signal into chronological alignment with the reference transmitter. Specifically, Time-Lock is achieved when a Positioning-Unit Devices' internally generated positioning signal has frequency coherence with an incoming reference positioning signal, and chronological coherence with the reference transmitter timebase.

Figure 2:
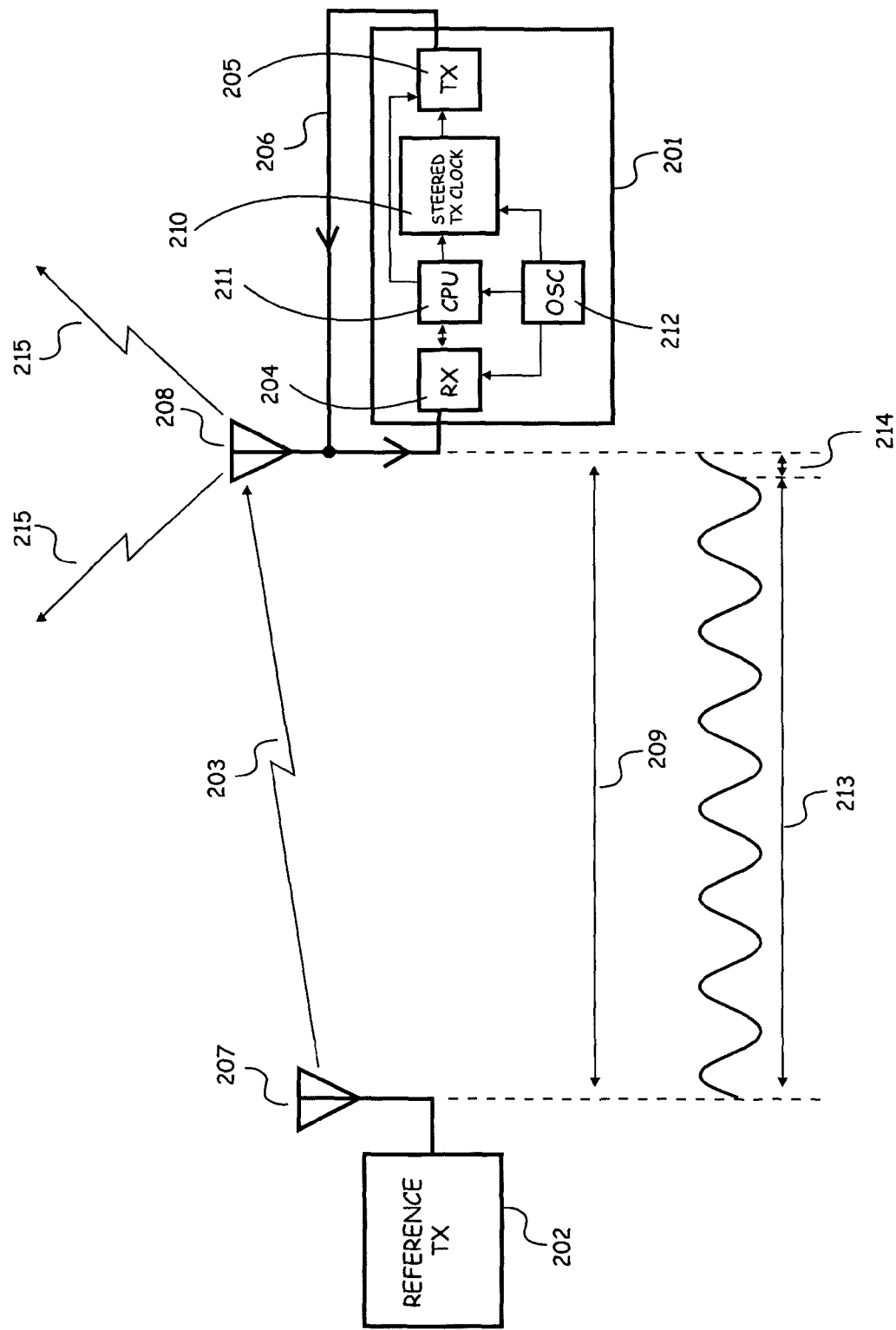
FIG. 2 is a graphical representation of another embodiment of Time-Lock according to the present invention, incorporating a single reference transmitter broadcasting to a single Positioning-Unit Device.

A reference positioning signal is transmitted via a radio frequency (RF) carrier from a reference transmitter. The reference positioning signal can be generated from any valid time source, which may include Positioning-Unit Devices, Wide Area Augmentation System (WAAS) satellites, Global Navigation Satellite System (GNSS) satellites, Pseudolites, or any combination of valid sources. Referring now to FIG. 2, a Positioning-Unit Device 201 located at a known distance from a reference transmitter 202 receives a reference positioning signal 203 transmitted by the reference transmitter 202. The reference positioning signal 203 has a carrier component, a unique pseudo-random code component, and a data component. The Positioning-Unit Device 201 incorporates a position receiver 204 and a co-located transmitter 205. The position receiver 204 is capable of receiving positioning signals from all reference positioning signals in view 203, and also positioning signals from its co-located transmitter 205. In response to the received reference positioning signal 203, the Positioning-Unit Device 201 transmits a so-called slave positioning signal 206 from its transmitter 205, which is received by the Positioning-Unit Device position receiver 204. The slave positioning signal 206 has a carrier component, a unique pseudo-random code component, and a data component. The Positioning-Unit Device position receiver 204 receives and simultaneously samples the reference positioning signal 203 from the reference transmitter 202 and the slave positioning signal 206 from the co-located transmitter 205. A transmission time difference is then calculated between the received reference positioning signal 203 and the received slave positioning signal 206. The transmission time difference, as used in the preferred embodiment, is determined by:

(a) Comparing the integrated carrier phase (ICP) measurements determined from the carrier components of the reference positioning signal 203 and the slave positioning signal 206 to determine a carrier frequency difference.
(b) Demodulating and comparing the navigation data components from the reference positioning signal 203 and the slave positioning signal 206 to determine a coarse transmission time difference.
(c) Comparing the pseudorange measurements determined from the pseudo-random code components of the reference positioning signal 203 and the slave positioning signal 206 to determine a code pseudorange difference.
(d) Comparing the instantaneous carrier phase measurements determined from the carrier components of the reference positioning signal 203 and the slave positioning signal 206 to determine a carrier phase difference.

For precise time synchronization of the slave positioning signal 206 to the reference transmitter 202 timebase the signal propagation delay between the reference transmitter antenna 207 and the Positioning-Unit Device position receiver antenna 208 must be accounted for. The known geometrical distance in meters 209 from the reference transmitter antenna 207 to the Positioning-Unit Device position receiver antenna 208 can be converted to a signal time-of-flight by the formula: time-of-flight=distance/speed of light. The Positioning-Unit Device 201 incorporates a steered transmitter clock 210, which can be adjusted in frequency by the Positioning-Unit Device CPU 211. The correction to the steered transmitter clock 210 is determined by the Positioning-Unit Device CPU 211 from the time difference between the reference positioning signal 203 and the slave positioning signal 206 which is measured by the Positioning-Unit Device receiver 204, and offset by the reference positioning signal time-of-flight 209. This brings the slave positioning signal 206 into chronological synchronization with the reference transmitter 202 timebase.

The process of differencing the received reference positioning signal 203 with the slave positioning signal 206 eliminates the Positioning-Unit Device position receiver clock term, thereby allowing the Positioning-Unit Device 201 to follow the reference transmitter 202 timebase without any clock bias caused by the local Positioning-Unit Device oscillator 212. Furthermore, differencing between two channels of the same position receiver 204 eliminates any receiver line bias or group delay caused by the position receiver electronics.

Control States of a Positioning-Unit Device

In the preferred embodiment, Positioning-Unit Devices Time-Lock to reference transmitters using the following control states:

State 0: Reset
Reset all hardware

State 1: Acquire Reference
The Positioning-Unit Device CPU 211 initiates a search for a reference positioning signal 203 by the Positioning-Unit Device position receiver 204.

State 2: Lock to Reference
The Positioning-Unit Device position receiver 204 acquires a reference positioning signal 203 and reference transmitter 202 position and time is demodulated from its navigation data component by the Positioning-Unit Device CPU 211.

State 3: Synchronize Slave
The Positioning-Unit Device CPU 211 waits to allow for coarse time alignment with the reference positioning signal navigation data component. An internal clock generator is then initiated by the CPU 211.

State 4: Initialize Slave
The Positioning-Unit Device CPU 211 determines an appropriate and unique PRN code sequence for this particular Positioning-Unit Device 201 and assigns this PRN code sequence to the Positioning-Unit Device transmitter 205. The current frequency offset for the reference positioning signal 203 (relative to the Positioning-Unit Device oscillator 212) is also assigned to the Positioning-Unit Device steered transmitter clock 210 by the Positioning-Unit Device CPU 211. This serves to initialize the Positioning-Unit Device transmitter 205 to a frequency that is approximately the same as the frequency of the reference positioning signal 203. The Positioning-Unit Device CPU 211 also assigns the determined PRN sequence to a free receiver channel in the Positioning-Unit Device position receiver 204. The receiver channel is initialized with the same frequency offset and pseudorandom code phase value as the Positioning-Unit Device transmitter 205, in order to aid acquisition of the slave positioning signal 206 by the Positioning-Unit Device position receiver 204. The Positioning-Unit Device then initiates a transmission of the slave positioning signal 206.

State 5: Acquire Slave
The Positioning-Unit Device position receiver 204 initiates a search for the slave positioning signal 206.

State 6: Lock to Slave
The Positioning-Unit Device position receiver 204 acquires the slave positioning signal 206 and a coarse slave time is demodulated from its navigation data component.

State 7: Reference/Slave Frequency Lock
The simultaneous integrated carrier phase (ICP) measurements for the reference positioning signal 203 and slave positioning signals 206 are initialized (zeroed) and differenced by the Positioning-Unit Device position receiver 204. This differenced value represents the frequency and phase difference between the reference positioning signal 203 and the slave positioning signal 206. A control loop within the positioning unit device CPU 211, continuously applies corrections to the Positioning-Unit Device steered transmitter clock 210 to maintain a zero ICP difference between the reference positioning signal 203 and the slave positioning signal 206, thus maintaining Frequency Lock.

Alternatively the received reference positioning signal frequency offset value, as measured by the Positioning-Unit Device position receiver 204, can be fed directly to the Positioning-Unit Device steered transmitter clock 210 to create a so called "Frequency Tracking System" (FTS). The steered transmitter clock 210 simply emulates the frequency offset of the incoming reference positioning signal 203, thus maintaining Frequency Lock. This method requires the Positioning-Unit Device oscillator 212 to be common between position receiver 204 and transmitter 205.

State 8: Reference/Slave Code-Lock
Once State 7 Reference/Slave Frequency Lock is achieved the time difference between the reference positioning signal 203 and the slave positioning signal 206 can be accurately measured and any time bias eliminated. Reference/Slave Code-Lock is achieved when the Positioning-Unit Device steered transmitter clock 210 is slewed the requisite amount of time to bring the reference and slave positioning signals into PRN code alignment. The time-of-flight value 209 is used to offset the measured reference-slave time difference to remove the effect of the reference signal propagation delay, and the calculated time difference is then applied as a clock correction to the Positioning-Unit Device steered transmitter clock 210. The clock correction is achieved by engaging the Frequency Tracking System (FTS), and applying an additional frequency offset to the steered transmitter clock 210 for a predetermined time period. This additional frequency offset allows the slave positioning signal 206 to slew in time until it becomes time coherent with the reference transmitter 202 timebase. Once this Time Slew is completed the control loop is re-engaged. Alternatively, Code-Lock can be achieved by slewing the Positioning-Unit Device transmitter 205 PRN code generator the requisite amount of code phase (chips) whilst maintaining Frequency Lock.

Code-Lock is based on PRN code accuracy, which is inherently noisy. In the preferred embodiment stationary Positioning-Unit Devices filter PRN code noise to a sub carrier cycle level.

State 9: Reference/Slave Phase Lock

Once State 7 Reference/Slave Frequency Lock and State 8 Reference/Slave Code-Lock are achieved, two time errors still remain that must be corrected: (1) a 180 degree phase ambiguity and; (2) a time-of-flight phase offset.

(1) Correcting a 180 degree phase ambiguity: Data is demodulated from a PRN code positioning signal using a specialized Phase-Lock-Loop, well-known in the art as a "Costas Loop". The Costas Loop technique inherently incorporates a 180 degree phase ambiguity, and therefore can acquire and track positioning signals with a half cycle ambiguity. This half cycle ambiguity represents an approximate 200 picosecond time offset at 2.4 GHz. The Costas Loop ambiguity can be resolved by reference to a predetermined sequence of data bits, generally referred to as a preamble, transmitted in the navigation data component by transmitters within the location network. When the Costas Loop ambiguity is resolved, an arbitrary fixed phase difference becomes evident between the position receiver phase registers of the Frequency-Locked reference and slave positioning signals. This arbitrary phase offset is due to the arbitrary phase of the slave positioning signal and is adjusted in the following step (2) below.

(2) Correcting Time-of-Flight Phase Offset: A fractional-cycle time-of-flight phase offset is present due to the reference positioning signal propagation delay between the reference transmitter antenna 207 and the Positioning-Unit Device antenna 208. The geometrical distance 209 between the reference transmitter and the Positioning-Unit Device can be represented as a number of whole carrier cycles (the integer component) 213, plus a fractional carrier cycle (the fractional component) 214. The time-of-flight phase offset is the fractional cycle amount 214 computed from the known geometrical distance between the reference transmitter antenna 207 and the Positioning-Unit Device antenna 208. The integer component 213 is corrected in the State 8 Reference/Slave Code-Lock control state described above. The fractional component 214 however, is too fine to be corrected in the State 8 Reference/Slave Code-Lock state, and must therefore be corrected as a carrier phase adjustment. The Frequency Tracking System (FTS) is engaged and the Positioning-Unit Device steered transmitter clock 210 is time slewed the requisite fractional-cycle amount (from its currently measured arbitrary phase value determined in step (1) above) to a newly determined time-of-flight phase value. The Time-Lock-Loop (TLL) is then re-engaged. The Positioning-Unit Device carrier phase slave positioning signal 206 emanating from the Positioning-Unit Device antenna 208 is now chronologically synchronized with the reference transmitter 202 carrier phase positioning signal emanating from the reference transmitter antenna 207.

State 10: Reference/Slave All Lock

Once all of the above states have been achieved, the CPU 211 declares Time-Lock and the Positioning-Unit Device 201 begins transmission of its now fully synchronized unique positioning signal 215. The Positioning-Unit Device unique positioning signal 215 is now chronologically synchronized to the reference transmitter 202 timebase with an accuracy of picoseconds, a capability that is substantially beyond the capacity of any prior art.

Unique Positioning Signals

In the preferred embodiment each Positioning-Unit Device transmits a unique positioning signal, which consists of a carrier component, a pseudorandom code component, and a navigation data component. The carrier component is a sinusoidal radio frequency wave preferably transmitted in the 2.4 GHz ISM band, though the method of the present invention is equally applicable to other frequency bands. The pseudorandom number (PRN) code component is modulated upon the carrier component, and consists of a unique code sequence which can be distinguished amongst other pseudorandom code sequences transmitted by other devices on the same carrier frequency. This technique is known as Code Division Multiple Access (CDMA), and is well-known in the art. The navigation data component is proprietary information modulated upon the pseudorandom code component, and provides a communications link to transfer navigation information to Positioning-Unit Devices and roving position receivers. Navigation information may include network time, Positioning-Unit Device locations, metaphorical "reference clock lineage" information, and other desired network data.

Time-Lock Configurations

Time-Lock may be implemented in many different configurations. These configurations include:

1. A single reference transmitter broadcasting to a single Positioning-Unit Device;
2. A single reference transmitter broadcasting to a plurality of Positioning-Unit Devices;
3. One or more reference transmitters broadcasting through intermediary Positioning-Unit Devices;
4. A plurality of reference transmitters broadcasting to one or more Positioning-Unit Devices;
5. Point position time synchronization.

A Single Reference Transmitter Broadcasting to a Single Positioning-Unit Device.

A single reference transmitter can be used to broadcast a reference positioning signal to a single Positioning-Unit Device. FIG. 2 shows a Positioning-Unit Device 201 situated at a known location, and a reference transmitter 202 also situated at a known location. The Positioning-Unit Device 201 receives the reference positioning signal 203 transmitted by the reference transmitter 202 and the slave positioning signal 206 transmitted by the Positioning-Unit Device transmitter 205. In response to the received reference positioning signal 203 the Positioning-Unit Device 201 determines the reference positioning signal propagation delay 209 and applies an appropriate transmitter clock correction to chronologically synchronize the carrier component, unique PRN code component, and data component of its internally generated slave positioning signal 206 to the carrier component, PRN code component, and data component of the reference transmitter positioning signal 203. The Positioning-Unit Device subsequently transmits a unique positioning signal 215, which is chronologically synchronized to the reference transmitter 202 timebase.

Two positioning signals are not sufficient to determine a position solution in a roving position receiver. However, if the reference transmitter is a WAAS satellite the Time-Locked Positioning-Unit Device signal will be synchronous with GPS time to picosecond level, and therefore can be used by a position receiver as an additional precise ranging source for a conventional code-based GPS solution.

A single Reference Transmitter Broadcasting to a Plurality of Positioning-Unit Devices.

A single reference transmitter can be used to form a network of Positioning-Unit Devices when a plurality of Positioning-Unit Devices is in clear view of the reference transmitter.

Figure 3:
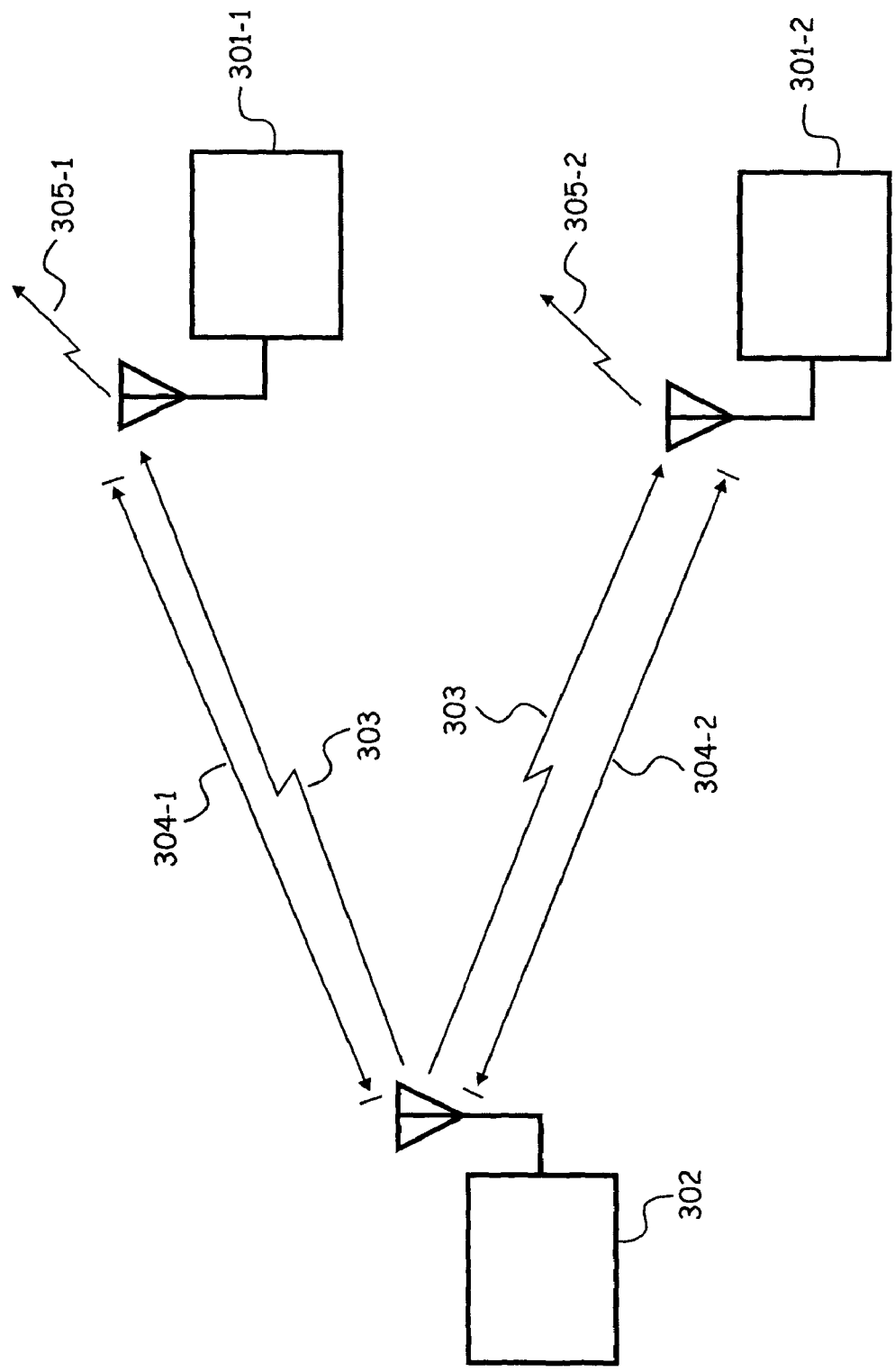
FIG. 3 is a graphical representation of another embodiment of Time-Lock according to the present invention, incorporating a single reference transmitter broadcasting to a plurality of Positioning-Unit Devices.

FIG. 3 shows a plurality of Positioning-Unit Devices situated at known locations 301-1 & 301-2, and a reference transmitter 302 also situated at a known location. The Positioning-Unit Devices 301-1 & 301-2 receive the reference positioning signal 303 transmitted by the reference transmitter 302. In response to the received reference positioning signal 303 each Positioning-Unit Device 301-1 & 301-2 determines its respective signal propagation delay 304-1 & 304-2 from the reference transmitter 302 and applies an appropriate transmitter clock correction to chronologically synchronize the carrier component, unique PRN code component, and data component of their internally generated positioning signals to the carrier component, PRN code component, and data component of the reference transmitter positioning signal 303. Each Positioning-Unit Devices subsequently transmits unique positioning signals 305-1 & 305-2, which are chronologically synchronized to the reference transmitter 302 timebase.

One or More Reference Transmitters Broadcasting through Intermediary Positioning-Unit Devices.

One or more time-synchronized reference transmitters can be used to form a network of Positioning-Unit Devices, without all Positioning-Unit Devices being in clear view of a reference transmitter. In this configuration the timing signal is cascaded via intermediary Positioning-Unit Devices. When an intermediary Positioning-Unit Device declares Time-Lock, subsequent Positioning-Unit Devices can use this intermediary Positioning-Unit Device as their reference positioning signal.

Figure 4:
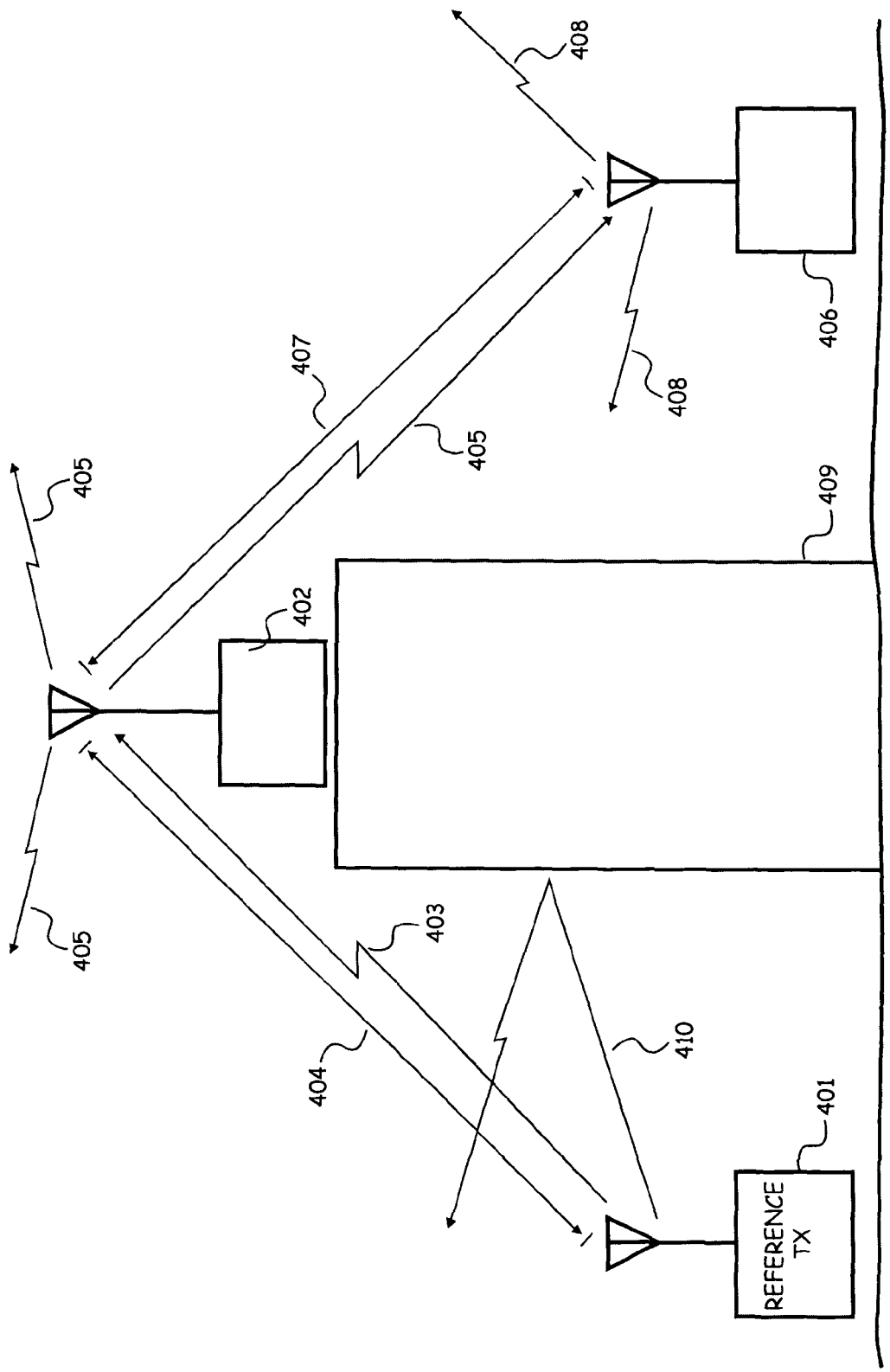
FIG. 4 is a graphical representation of another embodiment of Time-Lock according to the present invention, incorporating a reference transmitter broadcasting through an intermediary Positioning-Unit Device.

FIG. 4 shows a reference transmitter 401 situated at a known location, and a first Positioning-Unit Device 402 also situated at a known location. The first Positioning-Unit Device 402 receives the positioning signal 403 transmitted by the reference transmitter 401. In response to the received reference positioning signal 403 the first Positioning-Unit Device 402 determines the signal propagation delay 404 from the reference transmitter 401 and applies an appropriate clock correction to chronologically synchronize the carrier component, unique PRN code component, and data component of its internally generated positioning signal to the carrier component, PRN code component, and data component of the reference transmitter positioning signal 403. The first Positioning-Unit Device 402 subsequently transmits a unique positioning signal 405, which is chronologically synchronized to the reference transmitter 401 timebase.

A Second Positioning-Unit Device 406 situated at a known location, but not in view of the reference positioning signals 410 due to signal obstruction caused by building 409, subsequently receives positioning signal 405 from the first Positioning-Unit Device 402. In response to the received positioning signal 405 the second Positioning-Unit Device 406 determines the signal propagation delay 407 from the first Positioning-Unit Device 402 and applies an appropriate clock correction to chronologically synchronize the carrier component, unique PRN code component, and data component of its internally generated positioning signal to the carrier component, PRN code component, and data component of the first Positioning-Unit Device positioning signal 405. The second Positioning-Unit Device 406 subsequently transmits a unique positioning signal 408 incorporating a carrier component, PRN code component, and data component. This unique positioning signal 408 is chronologically synchronized to the first Positioning-Unit Device 402 timebase, which is also chronologically synchronized to the reference transmitter 401 timebase.

A Plurality of Reference Transmitters Broadcasting to One or More Positioning-Unit Devices.

A plurality of time-synchronized reference transmitters can be used to broadcast reference positioning signals to one or more Positioning-Unit Devices. In this configuration any reference signal error sources, such as multipath and tropospheric delay, can be averaged between reference transmitters to improve timebase accuracy.

Figure 5:
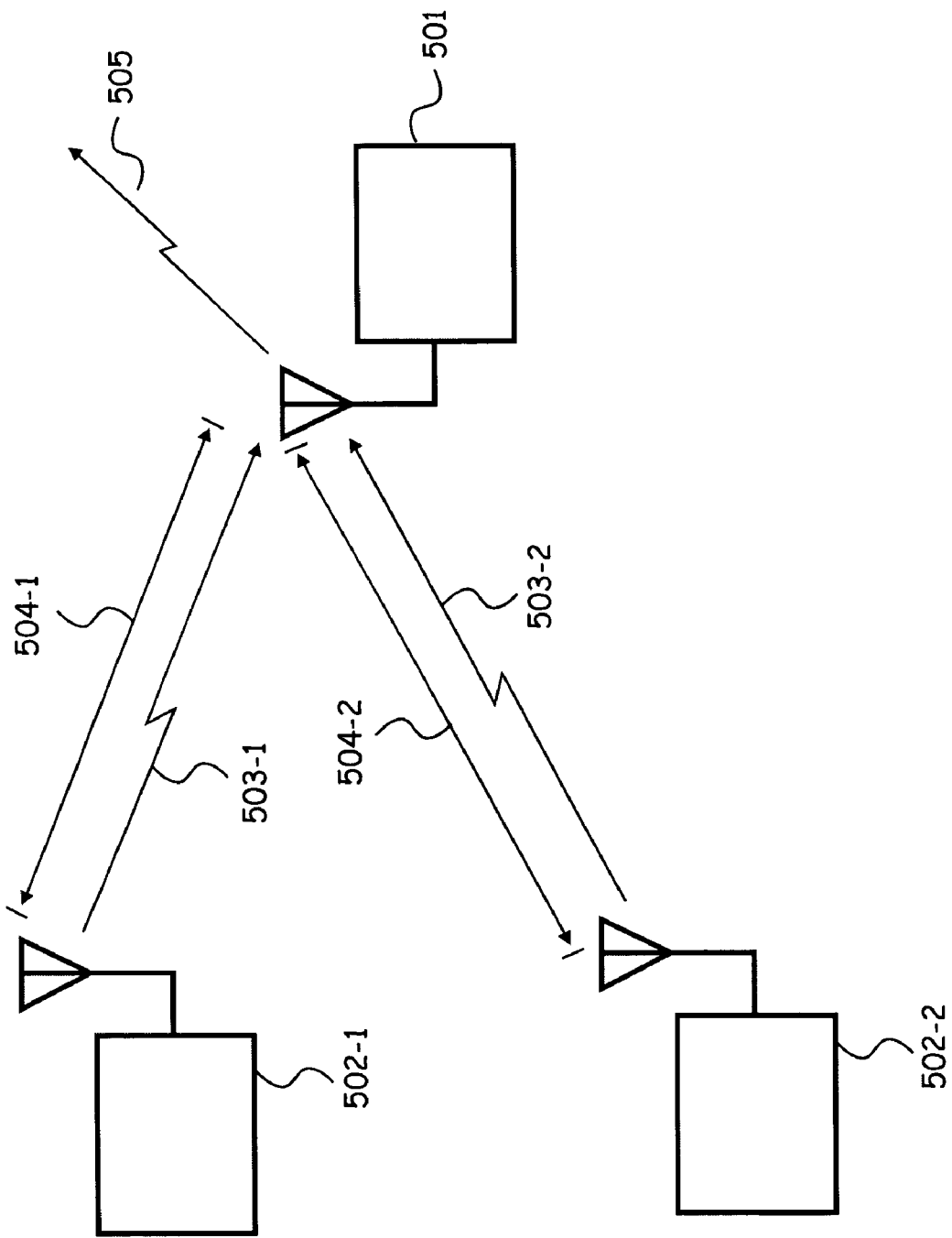
FIG. 5 is a graphical representation of another embodiment of Time-Lock according to the present invention, incorporating a plurality of reference transmitters broadcasting to a single Positioning-Unit Device.

FIG. 5 shows a Positioning-Unit Device 501 situated at a known location, and a plurality of reference transmitters 502-1 & 502-2 with common timebase, also situated at known locations. The Positioning-Unit Device 501 receives the reference positioning signal 503-1, 503-2 transmitted by the reference transmitters 502-1 & 502-2. In response to the received reference positioning signal 503-1, 503-2 the Positioning-Unit Device 501 determines the signal propagation delays 504-1 & 504-2 from each reference transmitter 502-1 & 502-2 and applies an appropriate clock correction to chronologically synchronize the carrier component, unique PRN code component, and data component of its internally generated positioning signal to the carrier components, PRN code components, and data components of the two reference transmitter positioning signals 503-1 & 503-2. The Positioning-Unit Device 501 subsequently transmits a unique positioning signal 505, which is chronologically synchronized to the timebase of the reference transmitters 502-1 & 502-2.

Point Position Time-Lock

A Positioning-Unit Device is also capable of synchronizing to a network timebase without the geometrical distance (reference positioning signal propagation delay) between reference transmitters and Positioning-Unit Device being known. For this embodiment of Time-Lock, at least four Time-Locked Positioning-Unit Devices must be in view. The Positioning-Unit Device, requiring to enter the network, self-surveys its three-dimensional position by calculating a single point position, which incorporates the Positioning-Unit Device position receiver clock offset. The Positioning-Unit Device position receiver clock offset accurately provides network time (relative to the local position receiver clock), which the Positioning-Unit Device slave transmitter can use as an accurate network timebase. In the preferred embodiment the Positioning-Unit Device uses a single point carrier solution to determine accurate network time to the picosecond level, a capability that is substantially beyond the capacity of prior art systems.

WAAS Reference

In the preferred embodiment a reference transmitter is a Wide Area Augmentation System (WAAS) Satellite. WAAS satellites are geostationary communications satellites, which transmit GPS differential corrections to GPS receivers.

WAAS satellites also transmit a unique positioning signal on the GPS L1 carrier frequency of 1575.42 MHz. This unique positioning signal is accurately synchronized to GPS time, with corrections provided for UTC. Therefore, a WAAS satellite makes an ideal reference transmitter, which is synchronous to the world standard timebase of UTC.

In the preferred embodiment a Positioning-Unit Device position receiver incorporates means for receiving positioning signals from other Positioning-Unit Devices in the 2.4 GHz ISM band, and also positioning signals from WAAS and GNSS satellites in the L band frequencies. A Positioning-Unit Device may use a WAAS satellite as a reference transmitter and Time-Lock its 2.4 GHz slave positioning signal to the 1575.42 MHz WAAS positioning signal. Time-Lock between disparate carrier frequencies is initiated by coherently down-converting the incoming WAAS and Positioning-Unit Device carriers to a common baseband frequency in the Positioning-Unit Device position receiver. Time-Lock is then performed with the methods previously described. Coherent down-conversion requires the local oscillators in the Positioning-Unit Device position receiver to be driven from a common oscillator. In the preferred embodiment the common oscillator generates clock information for all components of a Positioning-Unit Device, including the position receiver, transmitter, and central processing unit. Line biases and group delay are taken into consideration when computing inter-frequency Time-Lock, due to the disparate receive paths of the WAAS and Positioning-Unit Device carrier frequencies prior to down-conversion.

Figure 6:
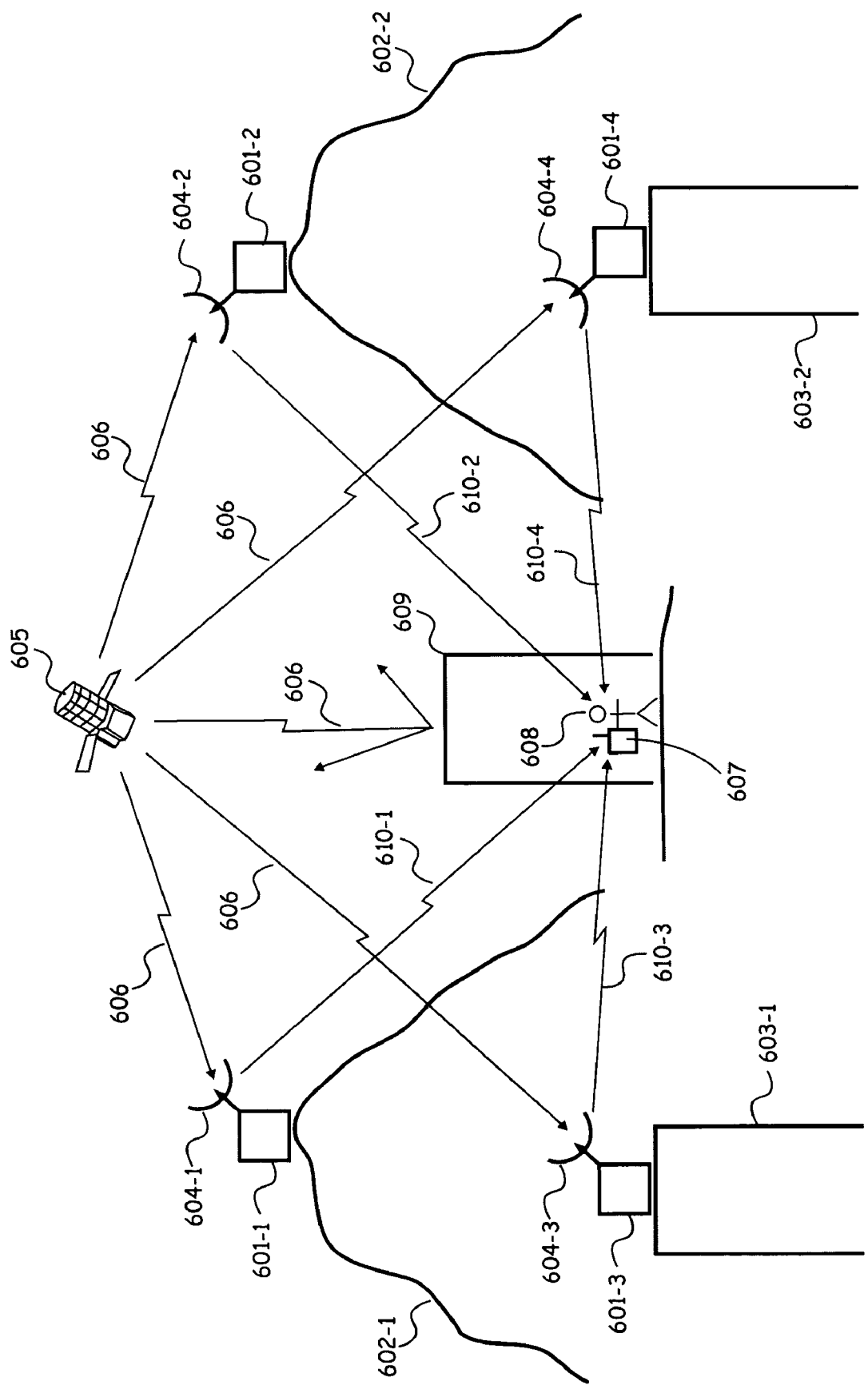
FIG. 6 is a graphical representation of another embodiment of Time-Lock according to the present invention, incorporating a Wide Area Augmentation System (WAAS) reference transmitter broadcasting to four Positioning-Unit Devices. The Positioning-Unit Devices subsequently transmit their own unique chronologically synchronized positioning signals to a roving position receiver situated in a satellite-occluded environment.

Referring now to FIG. 6, Positioning-Unit Devices 601-1, 601-2, 601-3 & 601-4 are placed in known locations with clear view of the sky, and preferably in elevated positions such as on top of hills 602-1 & 602-2 and/or tall buildings 603-1 & 603-2. If required, a directional receive antenna 604-1, 604-2, 604-3 & 604-4 may also be incorporated with each Positioning-Unit Device 601-1, 601-2, 601-3 & 601-4 and directed toward a geostationary WAAS satellite 605 (though these additional antennas are preferred but not essential for the method). Deploying directional antennas on Positioning-Unit Devices helps to mitigate multipath and improve received signal to noise ratios of the WAAS signal, which in turn improves reference timebase accuracy. Each Positioning-Unit Device 601-1, 601-2, 601-3, & 601-4 Time-Locks to the WAAS satellite signal 606, thus creating a precision UTC synchronized network with picosecond accuracy. A position receiver 607 held by a pedestrian 608 is situated inside a building 609. The WAAS satellite signal 606 cannot penetrate the building 609 due to its low signal power. However, Positioning-Unit Device signals 610-1, 610-2, 610-3, & 610-4 from the Positioning-Unit Devices 601-1, 601-2, 601-3, & 601-4 can penetrate the building 609 due to their close proximity. The position receiver 607 is capable of receiving Positioning-Unit Device positioning signals from all four Positioning-Unit Devices, which allows precise single point position determination in satellite occluded regions. In addition, once the position receiver 607 has calculated a position solution, UTC can be determined accurately. The present invention therefore also provides precision UTC time transfer in satellite occluded regions. Moreover, when the Position receiver 607 exits the building 609, signals from any Positioning-Unit Devices 601-1, 601-2, 601-3 & 601-4, WAAS satellites 605, or GNSS satellites in view can be used to form an overdetermined position solution, adding position integrity to the pedestrians calculated position.

Intermediary WAAS Reference

Positioning-Unit Devices placed in clear view of the WAAS satellite may also be used as intermediary reference signals in another embodiment. Positioning-Unit Devices that are unable to receive WAAS satellite signals may use intermediary "backbone" Positioning-Unit Devices as their time reference source. Therefore, UTC may be distributed throughout the network without all Positioning-Unit Devices being in clear view of the reference WAAS satellite.

Positioning-Unit Device Reference

Figure 7:
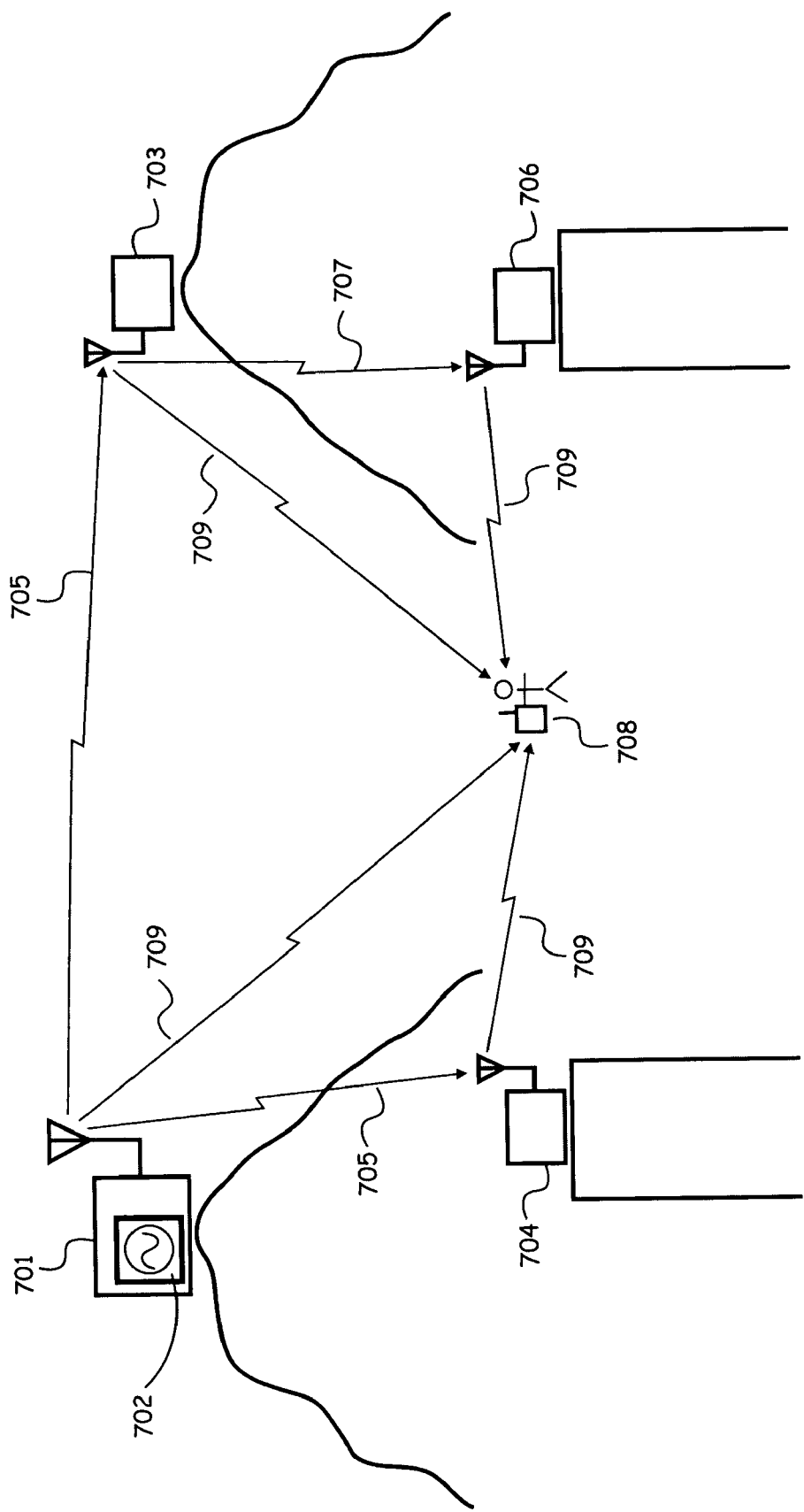
FIG. 7 is a graphical representation of another embodiment of Time-Lock according to the present invention, incorporating a Positioning-Unit Device reference transmitter broadcasting to three other Positioning-Unit Devices. The Positioning-Unit Devices subsequently transmit their own unique chronologically synchronized positioning signals to a roving position receiver.

In the event of a WAAS satellite not being available, it is preferable that at least one Positioning-Unit Device provides the timebase for a network of Positioning-Unit Devices. Referring now to FIG. 7, a first Positioning-Unit Device 701 situated at a known location is designated as the reference transmitter and creates a system timebase from its internally generated clock 702. Two subsequent Positioning-Unit Devices 703 & 704 situated at known locations Time-Lock to the first Positioning-Unit Device reference positioning signal 705. A fourth Positioning-Unit Device 706, which is situated at a known location but out of range of the first Positioning-Unit Device 701, Time-Locks to the second Positioning-Unit Device unique positioning signal 707. Therefore the system allows accurate cascaded time transfer through intermediary Positioning-Unit Devices. Position receiver 708 receives time-synchronous positioning signals 709 being transmitted by all Positioning-Unit Devices in view 701, 703, 704, & 706 and subsequently calculates a single point position solution. Further, the time calculated at the position receiver 708 will be chronologically-synchronous with the reference clock 702 of the reference Positioning-Unit Device 701. The arbitrary time value of the reference clock 702 within the Positioning-Unit Device 701 is of no consequence if the user is only concerned with position determination. If the user wishes time alignment with a global timebase, then the reference clock 702 within the reference Positioning-Unit Device 701 needs to be steered to UTC.

Positioning-Unit Device Reference Steered by GNSS Timebase

In the event of a WAAS satellite signal not being available, and alignment to a global timebase is necessary for the network, it is preferable that a reference Positioning-Unit Device be steered to UTC by a GNSS timebase. A GNSS timebase requires a position receiver, positioned at a known location, to compute a time solution using at least one GNSS satellite. Time accuracies in the order of 50 nanoseconds are achievable using this technique. Relative time accuracy between Positioning-Unit Devices, which are Time-Locked to the reference Positioning-Unit Device, will remain at the picosecond level.

Inter-Network Position Solutions

A plurality of reference transmitters may be used to create a plurality of autonomous networks. An autonomous network has its own unique timebase, which is generated by the reference transmitter. Position receivers that are situated within a single autonomous network can determine position, velocity, and time (PVT) using a single point position solution. The position receiver's time will be determined relative to the network timebase (i.e. the reference transmitter clock) and is termed an intra-network position solution. Position receivers that are located at the boundary of two autonomous networks, and receiving positioning signals from Positioning-Unit Devices from both networks, must first distinguish between the two network timebases before determining their position. This can be described as an inter-network position solution, and requires a roving position receiver to first chose a single timebase and apply clock corrections to the second timebase before computing a single point position solution.

In the preferred embodiment, Positioning-Unit Devices also include network identification (Network I.D.) information in their network data. Network I.D. maps the reference-time interconnectivity of Positioning-Unit Devices, such that Positioning-Unit Devices and position receivers can determine the origin and metaphorical "lineage" of reference clock data for each Positioning-Unit Device in view. This allows a Positioning-Unit Device or position receiver located at the boundary of two autonomous networks to determine which Positioning-Unit Devices are associated with each network, and therefore which Positioning-Unit Devices require clock correction within the roving position receiver position calculations. Each Positioning-Unit Device receives Network I.D. information from all other Positioning-Unit Devices in view, and in response generates and transmits its own Network I.D. information to all other Positioning-Unit Devices and roving position receivers in view.

Figure 8:
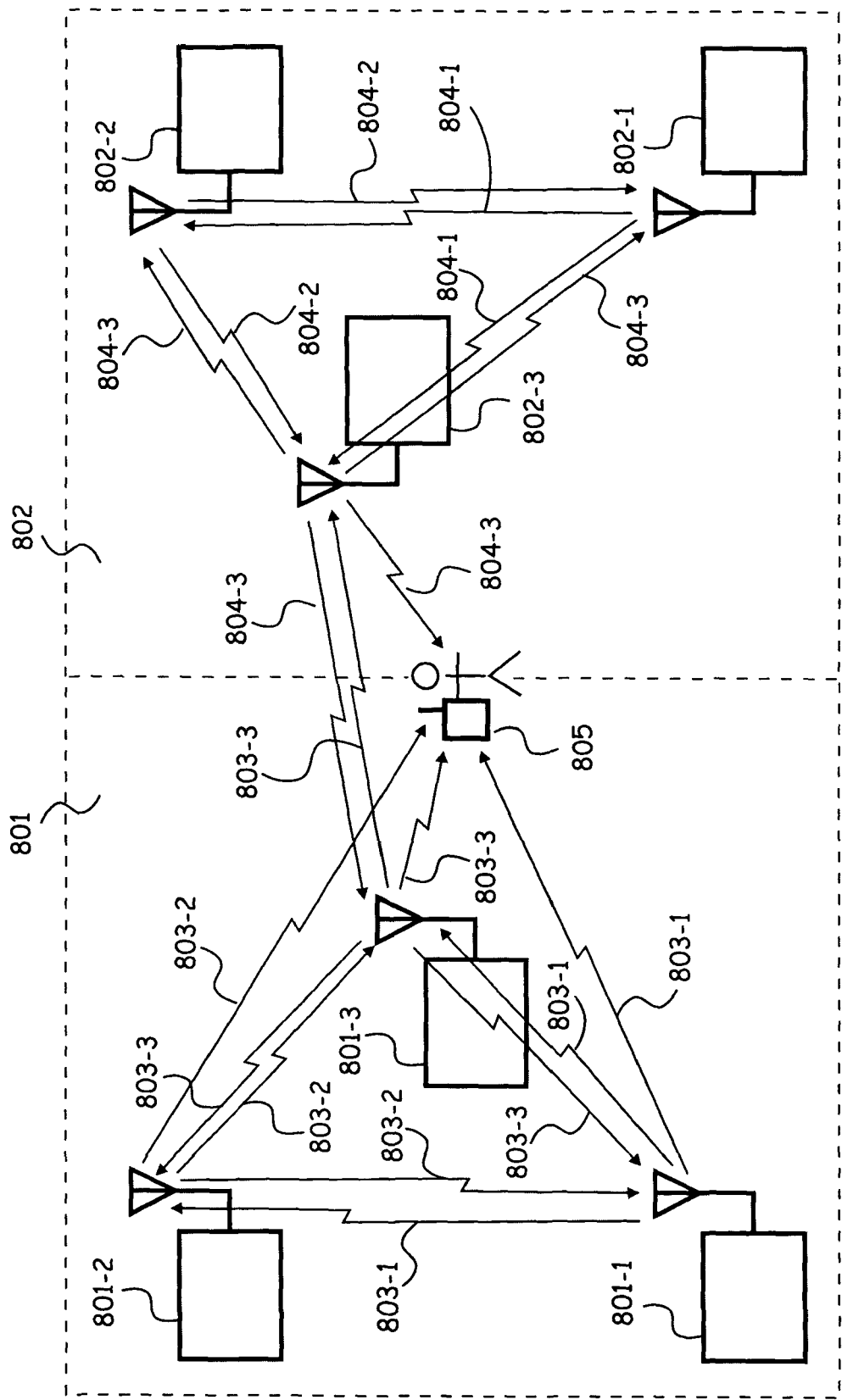
FIG. 8 is a graphical representation of another embodiment of Time-Lock according to the present invention, incorporating two autonomous networks of Positioning-Unit Devices, and a roving position receiver situated at the boundary of the two networks. The boundary Positioning-Unit Devices subsequently transmits inter-network corrections to the roving position receiver.

Referring now to FIG. 8, there is depicted two autonomous networks of Positioning-Unit Devices 801 & 802. Positioning-Unit devices 801-1, 801-2, and 801-3 are in view of one another and communicate to each other via positioning signals 803-1, 803-2, and 803-3. Positioning-Unit devices 802-1, 802-2, and 802-3 are in view of one another and communicate to each other via positioning signals 804-1, 804-2, and 804-3. A Positioning-Unit Device situated near the boundary of the two networks 801-3 receives Positioning-Unit Device positioning signals 804-3 from an adjacent-network Positioning-Unit Device 802-3 and measures the timebase difference, or clock bias, of the adjacent network timebase with respect to its own network 801 timebase. The Positioning-Unit Device 801-3 transmits clock corrections for the adjacent-network Positioning-Unit Devices 802-1, 802-2, & 802-3 in its network data, which is incorporated in its positioning signal 803-3. Positioning signals from only one adjacent-network Positioning-Unit Device 802-3 needs to be received by Positioning-Unit Device 801-3 when forming a network correction value, as all clocks in an autonomous network are time coherent. Furthermore, only one Positioning-Unit Device 801-3 need measure an adjacent network, as its transmitted network clock corrections which are sent in the network data of its positioning signal 803-3, are received and relayed to other Positioning-Unit Devices within its own network 801, for subsequent transmission 803-1 & 803-2 to roving position receivers 805.

The transmitted correction value, transmitted in the network data of the Positioning-Unit Device 801-3 positioning signal 803-3, is received by a position receiver 805 that is roving between networks 801 & 802. The roving position receiver applies the received network clock corrections from Positioning-Unit Device 801-3 and subsequently calculates a single point position solution using all Positioning-Unit Device positioning signals in view 803-1, 803-2, 803-3, and adjacent network Positioning-Unit Device positioning signal 804-3. With a single point position solution calculated the roving position receiver 805 clock will be time coherent with the network 801 timebase that provided the clock corrections. Furthermore, the adjacent network Positioning-Unit Device 802-3 can also receive positioning signals 803-3 from the first Positioning-Unit Device 801-3 and measure the timebase difference of the first network 801 with respect to its own network 802 timebase. The adjacent-network Positioning-Unit Device 802-3 then transmits clock corrections for the its adjacent-network Positioning-Unit Devices 801-1, 801-2, & 801-3 in its network data within its positioning signal 804-3, thereby allowing roving position receivers 805 to choose between timebases, if required.

Multiple Frequency Time-Lock

In the preferred embodiment a plurality of positioning signals are transmitted on a plurality of frequencies from each Positioning-Unit Device. Position receivers subsequently interpret the plurality of positioning signals to generate a so called wide-lane for integer carrier cycle ambiguity resolution (AR). RF carrier signals experience a time delay whilst passing through transmitter and receiver electronics, known as "group delay". Group delay can vary many nanoseconds, depending on frequency and ambient temperature. Therefore, a plurality of carrier frequencies generated from a common oscillator and transmitted through the same transmit path will experience unequal time delays due to the carrier frequency differences, and further experience varying time delays caused by temperature change of transmitter electronics. This causes transmitted positioning signals that are not phase coherent. Non phase-coherent positioning signals will induce range errors into the wide-lane ambiguity resolution (AR) process.

A Positioning-Unit Device can eliminate the non-coherent phase problem from a reference transmitter by transmitting a plurality of frequency-diverse positioning signals, which are individually time-locked to their respective incoming reference positioning signals. A Positioning-Unit Device incorporates a plurality of steered transmitter clocks, capable of steering a plurality of positioning signals, which are transmitted on a plurality of carrier frequencies. The Positioning-Unit Device position receiver tracks the plurality of frequency-diverse reference positioning signals, and also tracks the plurality of frequency-diverse slave positioning signals. The Positioning-Unit Device Time-Locks each frequency-diverse reference positioning signal to its respective frequency-diverse slave positioning signal, such that each slave positioning signal is chronologically synchronized with the reference transmitter. The Positioning-Unit Device then transmits its plurality of frequency-diverse positioning signals, which are time-coherent with the group delay from the reference transmitter. With at least three time-locked Positioning-Unit Devices in view, a position receiver determines wide-lane integer ambiguity resolution (AR) from each Positioning-Unit Device in view. The reference transmitter group delay has created an AR range error, which is common amongst the Time-Locked Positioning-Unit Devices. Therefore the same AR induced range error is evident on each Positioning-Unit Device pseudorange. The position receiver interprets this common pseudorange error as a receiver clock bias and eliminates the error in the single point position calculation.

Network Co-Ordinate Frame

A prerequisite for Time-Lock is the knowledge of the Positioning-Unit Device positions with respect to a reference co-ordinate frame. Any valid co-ordinate frame may be used, but in the preferred embodiment the Earth Centered Earth Fixed (ECEF) co-ordinate frame is used, which is also the co-ordinate frame used by GPS and WAAS. In the preferred embodiment, Positioning-Unit Devices self-survey from GNSS, and/or WAAS, and/or other Positioning-Unit Devices to determine an ECEF co-ordinate.

Transmission Frequency

In the preferred embodiment, Positioning-Unit Devices transmit in the unlicensed Industrial Scientific Medical (ISM) band of 2.4 GHz to 2.48 GHz. The 2.4 GHz ISM band allows the development of Positioning-Unit Device networks without regulatory constraint, and without interference to current navigation systems such as GPS. The 2.4 GHz ISM band also allows 83.5 MHz bandwidth, which can be used for increased chipping rates of direct sequence spread spectrum positioning signals, or the use of multiple carriers for widelane integer cycle ambiguity resolution.

Description of Positioning-Unit Device Hardware

In the preferred embodiment, a Positioning-Unit Device incorporates a position receiver, a transmitter, a central processing unit (CPU), and a common oscillator. The position receiver incorporates a plurality of receive channels capable of receiving a plurality of positioning signals, each comprising a carrier component, a PRN code component, and a data component. The transmitter incorporates at least one RF carrier generator, at least one PRN code generator, and at least one steered clock. The CPU comprises means for interpreting positioning signals received by the position receiver, responsive means to control the transmitter steered clock and means to generate navigation data. The common oscillator provides a coherent local timebase for all components of the Positioning-Unit Device.

Figure 9:
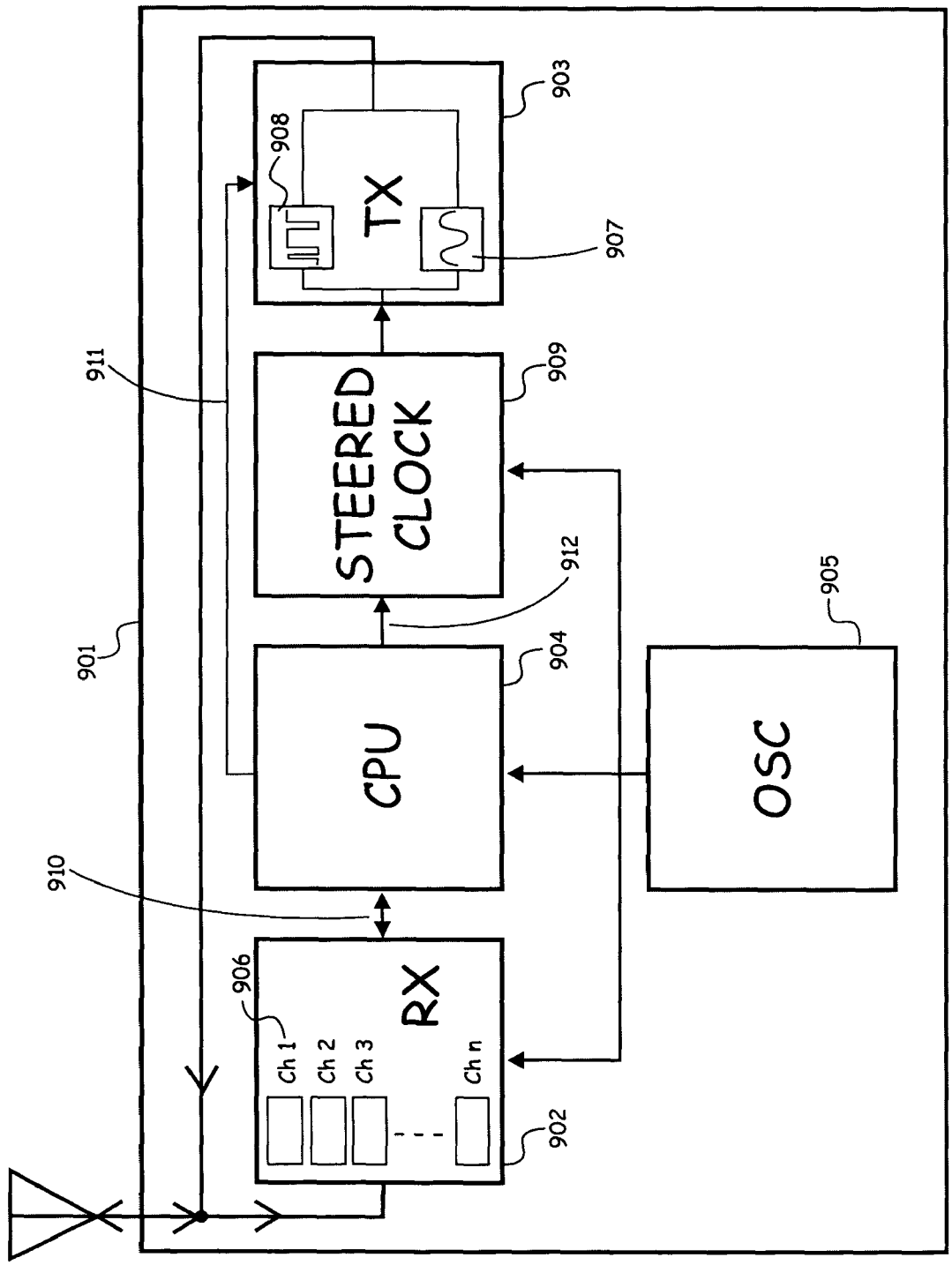
FIG. 9 is a block diagram of Positioning-Unit Device hardware, according to the present invention.

Referring now to FIG. 9, there is depicted a Positioning-Unit Device 901 incorporating a position receiver 902, a transmitter 903, a Central Processing Unit (CPU) 904, and a common oscillator 905. The position receiver 902 incorporates a plurality of receive channels 906, and the transmitter 903 incorporates one or more of carrier generator 907, one or more of code generator 908, and one or more of steered clock 909. The CPU 904 includes means for position receiver communication 910, means for transmitter communication 911, and means for transmitter steered clock communication 912.

Positioning-Unit Device Position Receiver

A Positioning-Unit Device position receiver comprises at least one receive channel capable of receiving and demodulating at least one reference positioning signal from a reference transmitter, and at least one receive channel capable of receiving and demodulating at least one co-located transmitter slave positioning signal. Preferably, a Positioning-Unit Device position receiver is capable of receiving a plurality of reference positioning signals for increased accuracy and integrity. The Positioning-Unit Device position receiver preferably should also be capable of receiving positioning signals from other Positioning-Unit Devices transmitting in the 2.4 GHz ISM band, and positioning signals from WAAS and GNSS satellites transmitting in the microwave L band frequencies. A Positioning-Unit Device position receiver tracks, demodulates, and interprets positioning signals utilizing the same methodologies used in conventional GPS receiver design. GPS receiver processing and design are well-known in the art and are not a subject described here.

Positioning-Unit Device Transmitter

A Positioning-Unit Device transmitter has many similarities to a conventional GPS pseudolite, with one major and critical improvement: a steered transmitter clock. In the preferred embodiment the steered transmitter clock is generated in the digital domain using Direct Digital Synthesis (DDS) techniques. DDS technology produces a digitally generated oscillator, which can be frequency controlled to millihertz accuracies, thus allowing the transmitter clock to be precisely "slaved" to an incoming reference signal. The transmitter also incorporates at least one radio frequency (RF) carrier generator, and at least one pseudorandom number (PRN) code generator. The RF carrier generator produces the carrier component, which is a sinusoidal radio frequency wave, preferably transmitted in the 2.4 GHz ISM band, and the PRN code generator produces the code component, which comprises a unique code sequence that can be distinguished amongst other pseudorandom code sequences transmitted on the same carrier frequency. A plurality of codes can be generated on a plurality of frequencies to produce a so called "wide lane", which allows carrier integer cycle ambiguity to be resolved in a roving position receiver. In the preferred embodiment Positioning-Unit Device transmitters are pulsed in a Time Division Multiple Access (TDMA) scheme, such that high power CDMA positioning signals do not jam weaker CDMA positioning signals transmitted on the same carrier frequency. This phenomenon is known as the "near/far problem" and is also well-known in the art.

Positioning-Unit Device Central Processing Unit

The Positioning-Unit Device CPU comprises:

a) Means to determine the current position of the Positioning-Unit Device.

Position determination can be achieved through either self-survey or through manual initialization. Self-survey requires the Positioning-Unit Device to be in view of at least four other reference Positioning-Unit Devices to determine a three-dimensional single point position solution, or alternatively, a Positioning-Unit Device may be in view of at least three GNSS satellites plus at least one reference Positioning-Unit Device. In this embodiment the reference Positioning-Unit Device supplies both code and carrier differential corrections for all GNSS satellites in view to the Positioning-Unit Device. The Positioning-Unit Device then calculates an accurate position relative to the reference Positioning-Unit Device.

Manual initialization is achieved by placing the Positioning-Unit Device at a predetermined location and manually entering the geographical coordinate values into Positioning-Unit Device memory. In the preferred embodiment a first Positioning-Unit Device is manually initialized using precisely known coordinates, with subsequent Positioning-Unit Devices self-surveying from GNSS satellites and the first Positioning-Unit Device.

b) Means to initiate a reference signal search by the position receiver.

All channels of the position receiver are set to search for any reference positioning signal in view.

c) Means to acquire at least one reference positioning signal and extract network time and network data from the navigation data component.

d) Means to determine the signal propagation delay from the reference transmitter to the Positioning-Unit Device.

Reference transmitter position coordinates are first extracted from the reference positioning signal navigation data, and compared to the known Positioning-Unit Device location. The computed geometrical distance between reference transmitter and Positioning-Unit Device is converted into a time-of-flight offset.

e) Means to initialize the slave transmitter code generator with an appropriate unique PRN code.

f) Means to generate and pass appropriate network time and network data to the transmitter, which is transmitted as the navigation data component in the slave positioning signal.

Navigation Data is modulated upon the transmitter-generated PRN code, which is subsequently modulated upon the transmitter-generated RF carrier. Navigation data includes time-of-week information, Positioning-Unit Device location, and other network data such as location and status of other Positioning-Unit Devices and GNSS satellites.

g) Means to apply the calculated time-of-flight offset and initialize the slave transmitter to approximate network time and frequency.

h) Means to initiate the position receiver to search for the slave positioning signal.)
i) Means to acquire the slave positioning signal and apply a control loop to obtain frequency coherence between the reference and slave positioning signals.

The CPU measures the instantaneous integrated carrier phase (ICP) difference of the reference and slave positioning signals and applies a control loop, known as a "Time-Lock-Loop (TLL)". The output of the TLL applies correction values to the steered transmitter clock, in order to zero the ICP difference.

j) Means to extract the transmitted slave time from the slave positioning signal navigation data component and determine the time difference between the reference positioning signal and slave positioning signal.
k) Means to Time Slew the steered transmitter clock the requisite amount to zero the time difference between the reference positioning signal and the slave positioning signal, such that the slave positioning signal is chronologically aligned with the reference transmitter time.
l) Means to declare Time-Lock status.

Common Oscillator

The common oscillator provides a coherent local timebase for all components of the Positioning-Unit Device. In particular, the same oscillator is used to drive the position receiver, the CPU, and the steered transmitter clock. A coherent local timebase allows open-loop frequency tracking of the received reference positioning signal using a so called Frequency Tracking System (FTS). With FTS the received reference positioning signal frequency offset, as measured by the Positioning-Unit Device position receiver, is fed directly to the Positioning-Unit Device steered transmitter clock. The steered transmitter clock simply emulates the frequency offset value of the incoming reference positioning signal, thus eliminating the common oscillator term and maintaining Reference/Slave Frequency Lock between the reference and slave positioning signals. FTS aids in the acquisition and time adjustment of the slave positioning signal.

Description of the Mobile System

A roving position receiver preferably comprises a plurality of receive channels that are capable of receiving and interpreting positioning signals from Positioning-Unit Devices, which are preferably transmitting in the 2.4 GHz ISM band. The roving position receiver is also preferably capable of receiving and interpreting positioning signals from GNSS and WAAS satellites transmitting in the L band frequencies. The roving position receiver is preferably capable of demodulating navigation data incorporating network data from all positioning signals in view. This allows determination of Positioning-Unit Device network time, GNSS time, Positioning-Unit Device locations, satellite locations, and other network and GNSS data. In the preferred embodiment network time is derived from GNSS time via WAAS satellites, thereby making network time and GNSS time time-coherent. A roving position receiver also preferably incorporates means to make code-based pseudorange measurements for each positioning signal in view, means to make carrier phase measurements for each positioning signal in view, and means to solve for position, velocity, and time (PVT) using single point position determination. Single point position determination can be accomplished by using a conventional GPS position solution, which is generally a form of least squares regression that is well known in the art.

The roving position receiver preferably incorporates means to determine integer cycle ambiguity. In the preferred embodiment integer cycle ambiguity is resolved using wide-lane techniques. Once integer cycle ambiguity is resolved, a precise carrier phase pseudorange is determined from the roving position receiver to the Positioning-Unit Device. The carrier pseudorange comprises an integer number of carrier cycles (the integer component) plus a fractional carrier cycle amount (fractional component or phase component), and is termed a pseudorange due to the unknown position receiver clock bias. Time-Locked Positioning-Unit Devices exhibit time coherency to tens of picoseconds, thereby allowing a single point position solution to be formed from the precise carrier pseudoranges without the need for differential correction.

A position receiver tracks, demodulates, and interprets positioning signals generated by a network of Time-Locked Positioning-Unit Devices utilizing the same methodologies used in conventional GPS receiver design. GPS receiver processing and design, as well as Wide-Lane Ambiguity Resolution, are well-known in the art and are not subjects described here.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A method of generating frequency coherence between a received reference positioning signal carrier component and a unique positioning signal carrier component, said received reference positioning signal carrier component being transmitted by at least one reference transmitter and said unique positioning signal carrier component being generated by a positioning-unit device, said positioning-unit device comprising a receiver, a frequency steerable clock connected to a transmitter and a common oscillator, said common oscillator being common to said receiver frequency steerable clock within said positioning-unit device, said method comprising the steps of:

a) receiving said reference positioning signal carrier component at said receiver within said positioning-unit device;
b) measuring a frequency offset of said received reference positioning signal carrier component relative to said common oscillator;
c) adjusting said frequency steerable clock by an amount derived from said measured frequency offset;
d) further adjusting said frequency steerable clock by applying an additional frequency offset for a predetermined time period to time slew said unique positioning signal;
e) generating said unique positioning signal carrier component at an aligned frequency with said reference positioning signal carrier component, wherein said unique positioning signal carrier component is aligned with said frequency steerable clock;
f) continuously adjusting said unique positioning signal carrier component by applying said measured frequency offset to said frequency steerable clock, said frequency steerable clock referenced to said common oscillator, such that the frequency of said adjusted unique positioning signal carrier component is aligned with the frequency of said reference positioning signal carrier component.

2. The method according to claim 1, wherein said frequency steerable clock is adjusted in step (c) by an amount equivalent to said measured frequency offset.

3. The method according to claim 1, wherein said adjusted unique positioning signal is transmitted.

4. The method according to claim 1, wherein said adjusted unique positioning signal functions as a reference positioning signal for other positioning-unit devices.

5. The method according to claim 1, wherein said at least one reference transmitter includes positioning-unit devices, Wide Area Augmentation System satellites, Global Navigation Satellite System satellites, Pseudolites, or other devices that incorporate timing information.

6. A positioning-unit device for generating frequency coherence between a received reference positioning signal carrier component and a unique positioning signal carrier component, said received reference positioning signal carrier component being transmitted by at least one reference transmitter and said unique positioning signal carrier component being generated by said positioning-unit device, said positioning-unit device comprising:
   a) a receiver for receiving said reference positioning signal carrier component;
   b) a frequency steerable clock connected to a transmitter;
   c) means for measuring a frequency offset of said received reference positioning signal carrier component relative to a common oscillator, said common oscillator being common to said receiver and said frequency steerable clock within said positioning-unit device;
   d) means for adjusting said frequency steerable clock by an amount derived from said measured frequency offset;
   e) means for further adjusting said frequency steerable clock by applying an additional frequency offset for a predetermined time period to time slew said unique positioning signal;
   f) means for generating said unique positioning signal carrier component at an aligned carrier frequency with said reference positioning signal carrier component, wherein said unique positioning signal carrier component is aligned with said frequency steerable clock;
   g) means for continuously adjusting said unique positioning signal carrier component by applying said measured frequency offset to said frequency steerable clock, said frequency steerable clock referenced to said common oscillator;
   such that the frequency of said adjusted unique positioning signal carrier component is aligned with the frequency of said reference positioning signal carrier component.

7. The positioning-unit device according to claim 6, wherein said frequency steerable clock is adjusted in step (c) by an amount equivalent to said measured frequency offset.

8. The positioning-unit device according to claim 6, wherein said adjusted unique positioning signal is transmitted.

9. The positioning-unit device according to claim 6, wherein said adjusted unique positioning signal functions as a reference positioning signal for other positioning-unit devices.

10. The positioning-unit device according to claim 6, wherein said at least one reference transmitter includes positioning-unit devices, Wide Area Augmentation System satellites, Global Navigation Satellite System satellites, Pseudolites, or other devices that incorporate timing information.

* * * * *